United States Patent
Frei et al.

[15] 3,675,740
[45] July 11, 1972

[54] BICYCLE DISC BRAKE

[72] Inventors: Karl Frei, Horseheads; Edwin Elliott Hood, Elmira, both of N.Y.

[73] Assignee: The Bendix Corporation

[22] Filed: March 29, 1971

[21] Appl. No.: 129,091

[52] U.S. Cl.............................................188/26, 188/72.8
[51] Int. Cl............................................................B62l 5/06
[58] Field of Search...................................188/24–27, 72.7, 188/72.8

[56] References Cited

UNITED STATES PATENTS 1,645,975   10/1927   Tape.................................188/72.8 X
2,045,593   6/1936    Frankland.........................188/72.8 X

*Primary Examiner*—Duane A. Reger
*Attorney*—William S. Thompson and Plante, Hartz, Smith & Thompson

[57] ABSTRACT

A disc brake for bicycles operating with a rotor mounted externally and driven by the bicycle wheel hub. Means are provided to enable the rotor to shift normally to the plane of rotation to permit alignment during braking. The brake actuating pressure plate member is a full annular plate to provide for balanced braking and is capable of supporting up to 360° of working friction surface. The annular pressure plate is mechanically advanced into and out of brake engagement by a high gain helical screw thread connection.

10 Claims, 3 Drawing Figures

KARL FREI
EDWIN ELLIOTT HOOD
*INVENTORS*

BY *W S Thompson*

BICYCLE DISC BRAKE

BACKGROUND OF THE INVENTION

The more well-known forms of bicycle brakes are the hub enclosed coaster brake and wheel rim or tire gripping caliper brakes. Generally, the coaster brake is actuated by the bicycle chain drive on reverse pedaling and offers a strong positive brake, but with a tendency to be oversensitive or grabby on initial actuation and complex due to the limited space in which it must be located. Caliper brakes are usually of the hand squeeze grip-actuated type through cables and are less reliable due to cable stretch, exposure to the elements and the like. While the disc brake is a well-known brake type, it has not been successfully applied to bicycles to the point of achieving wide acceptance in spite of the fact that it has a very good braking characteristic.

SUMMARY OF THE INVENTION

A bicycle disc brake with a high gain mechanical brake actuator which can develop very strong and positive braking forces in response to either hand or foot applied actuation forces. The brake rotor is self-aligning so as not to distort the braking parts during braking operation. A full annular plate actuator is utilized to develop balanced braking forces or up to 360° of working friction surfaces, if desired.

DETAILED DESCRIPTION OF THE PREFERRED EMBODIMENT

Figure 1:
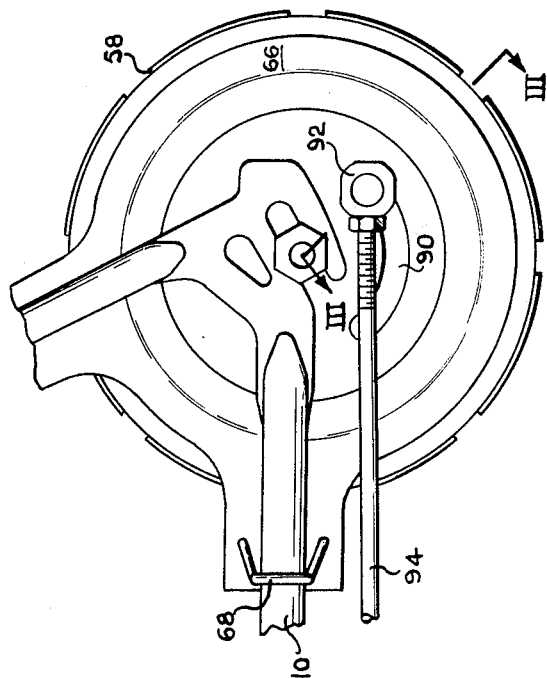
FIG. 1 is a partial and broken away side view of a bicycle showing pedal drive sprocket and rear wheel hub areas, particularly illustrating the disc brake mechanism of this invention.
Figure 2:
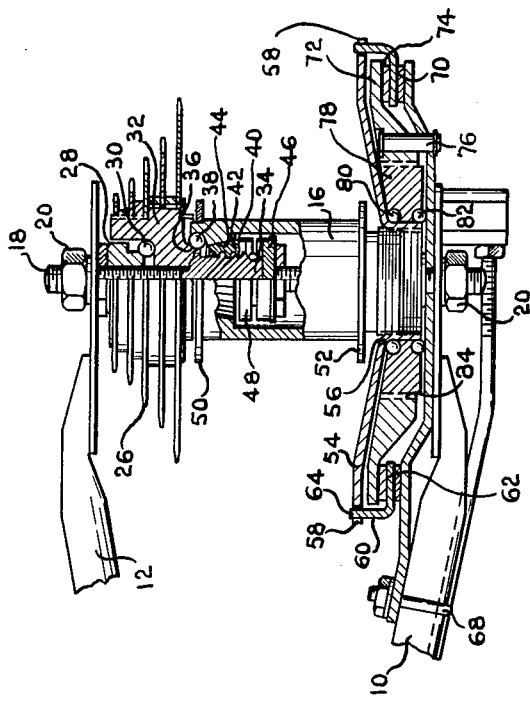
FIG. 2 is a partial broken away plan view of the same bicycle portion illustrated in FIG. 1 which shows another view of the disc brake mechanism.
Figure 3:
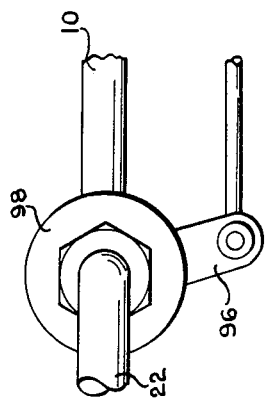
FIG. 3 shows a cross-sectional view of the disc brake taken along section line III—III of FIG. 1.
Figure 3:
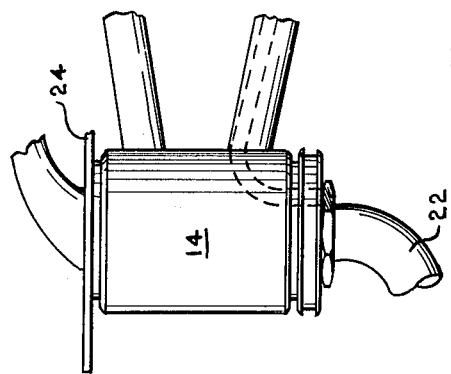
Figure 3:
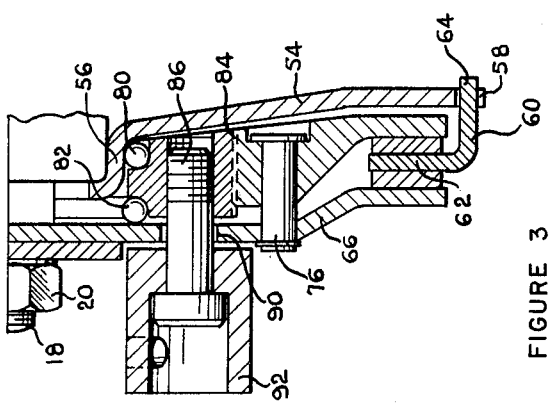

Referring to FIGS. 1 and 2, the bicycle frame parts are generally designated by numerals 10 and 12 for the bifurcated frame arms running from the pedal bearing housing 14 to the rear wheel hub 16 in a conventional manner. Hub 16 is rotatably mounted on a fixed axle 18 which extends through the terminal ends of the frame arms 10 and 12 and is affixed by attachment nuts 20. A crank arm mechanism 22, illustrated fragmentarily, is rotatably mounted in housing 14 and is adapted to be rotated by foot pedaling. A chain drive sprocket 24 is affixed to the crank arm mechanism and rotates therewith. Adjacent the hub 16 there is illustrated a multiple sprocket drive member 26 of the type utilized with derailleur multiple ratio chain drive systems. A mechanism, not shown, is utilized to selectively transfer a slack chain drive to the various diameter drive sprockets contained on the drive sprocket 26. It is also well known to have multiple sprockets attached to the crank arm mechanism for still greater available drive ratios.

Fixedly mounted on shaft 18 is a bearing cone or inner race member 28 which contains a circular track for ball bearings 30. A rotatable intermediate drive member 32 rides on ball bearings 30 and is secured to multi-ratio sprocket 26 to transmit driving rotation. Intermediate drive member 32 contains an axially extending portion 34 which projects into the hub and has circular groove 36 formed on its outer surface in which the bearings 38 are entrained. Bearings 38 support one end of hub 16 and the other hub side would be supported by another set of roller bearings, not illustrated. Axially extending portion 34 of the intermediate drive member 32 has helical screw threads 40 formed thereon. A conical friction clutch member 42 has complementary helical screw threads formed on its inner diameter and threadedly engages the axially extending portion 34. The outer surface of clutch 42 is conically shaped and is adapted to mate with a complementary surface 44 formed on the inner diameter of hub 16. A disc abutment member 46 is fixedly secured to axle 18 and provides a fixed anchor for one finger of a circular spring retarder member 48, the other finger of which frictionally engages the outer surfaces of cone clutch member 42 to impose a resistive drag thereon. During the forward pedaling mode of the bicycle operation, cone clutch 42 traverses on its helical screw threads into solid frictional engagement with hub 16 to provide a driving connection. When positive driving torque is not being applied, the hub 16 will overrun the friction clutch 42 during coasting or may slip in a reverse direction during backwalking of the bicycle. The operation of cone clutch 42 is more fully described in my co-pending patent application MOC 70/33–B entitled "Bicycle Drive and Braking Systems," mailed to the Patent Office concurrently with this application.

A pair of flanges 50 and 52 are fixed to the external surface of hub 16 and are adapted to receive the conventional bicycle wheel spokes. Outboard of the flange 52, a brake rotor plate member 54 having an inner rotor hub portion 56 is fixedly secured to the hub 16. The rotor plate member is of generally circular plate-like configuration and has a series of slots cut on the outer periphery designated by numerals 58. An annular rotor disc member 60 has a radially inwardly depending flange 62 of annular disc-like configuration and which forms friction surfaces on each side thereof. The rotor disc has axially extending projections 64 which mate with the slots in rotor plate member to permit relative axial movement of the rotor disc 62 while establishing a driving connection.

A reaction plate member 66 is disposed outboard of brake rotor disc 62 and is fixedly secured by U-bolt 68 to the bicycle frame arm 10. The reaction plate is generally of circular construction and is concentrically mounted over the axle 18 and held in position additionally by the axle bolt 20. Friction material, either in segmentive block form or as a continuous ring, may be attached to the brake reaction plate as designated by numeral 70, where it is in confronting braking relationship with one side of the rotor disc 62.

An annular pressure plate member 72 is disposed on the inboard side of the brake rotor disc 62 and may also contain friction material 74, which is in frictional engaging relationship with the inboard side of the rotor disc 62. The annular pressure plate member 72 is connected through pins 76 to the reaction plate member 66, which connection permits the annular pressure plate member to move axially or normally with respect to the rotor disc 62, but restrains said annular pressure plate member against rotative movement. A screw actuator member 78 is rotatively mounted on bearings 80 on the hub portion 56 of the rotor plate member. Screw actuator 78 is operative with a second ring of bearings 82 which operate as axial thrust bearings riding on fixed reaction plate 66. The screw actuator member 78 has helical screw threads 84 formed on its radially outer surface which mate with complementary helical screw threads formed on the inner diameter of the annular pressure plate member 72. An actuator stud 86 which is in the form of a threaded bolt has one end anchored in screw actuator 78 and the other end extends through reaction plate member 66 where it is in an accessible outboard location. The opening 90 in reaction plate 66 through which the stud 86 passes follows a circumferential line and spans an arcuate segment, as best shown in FIG. 1. Thus, stud 86, and hence screw actuator 78 may move a limited number of angular degrees with respect to the reaction plate 66.

A pivot block member 92 is retained by the head of stud 86 to provide an articulated connection therewith. Brake actuating rod 94 is attached to pivot block 92 and extends along the frame member 10 up to the vicinity of the crank housing 14 where it is connected by rod 96 which extends from the external housing 98 of a one-way clutch mounted on the crank arm 22. During forward rotation of the crank arm 22, clutch 98 overruns leaving the brake inactive; however, on reverse rotation of the crank arm 22, one-way clutch 98 engages and transmits a braking motion through rod 94, pivot block 92 to the actuator stud 86.

As the brake actuating stud 85 is moved in the forward direction as illustrated in FIG. 1, screw actuator member 78 is moved rotationally a limited number of angular degrees with respect to the annular pressure plate member 72. Because the annular pressure plate member 72 is restrained from rotation by pin 76, this limited relative rotation, by operation of the helical screw threads 84, causes the annular pressure plate member 72 to advance into braking engagement with the inboard surface of rotor disc 62. As the pressure plate bears against the rotor disc, the rotor disc moves axially until it comes into engagement with the friction material 70 contained on the reaction plate 66. At this point strong axially developed braking forces clamp the rotor disc firmly on both sides to create the clamping frictional forces.

The brake thus obtained may be actuated by foot pedal crank arm assembly as shown; however, due to high mechanical advantage attained through the helical screw threads 84, good strong braking forces may also be developed by a hand manipulated actuator. The full annular pressure plate member 72 and the full annular configuration of reaction plate 66 enable one to arrange balanced friction pads around a circumferential path or to obtain a full 360° of friction material or brake working surface, if so desired. It is also quite feasible to mount a hand actuated version of my disc brake on a front bicycle wheel as well as, or in lieu of, the rear drive wheel mounted brake shown.

I claim:

1. A disc brake for a bicycle having a fixed frame supported shaft and a rotatable hub concentrically mounted about said shaft, said disc brake comprising:
   a brake rotor member having an annular radially inwardly extending brake disc member, said brake rotor member adapted to be secured to said rotatable hub at one side thereof for rotation therewith;
   a brake reaction plate member adapted to be fixedly secured to the bicycle disposed adjacent said brake disc member on the outboard side thereof to provide a fixed reactive braking surface on one side of said rotatable brake disc member;
   an annular pressure plate member disposed on the inboard side of said brake disc member having a friction surface in confronting relationship with the brake disc member;
   attachment means connected to said annular pressure plate operative to permit limited axial movement while preventing rotational movement of said annular pressure plate; and
   a screw actuator threadedly connected to said annular pressure plate operative on rotation to move said annular pressure plate axially into braking engagement.

2. A disc brake for a bicycle as claimed in claim 1 wherein:
   said attachment means consists of a pin and hole interconnection between said annular pressure plate and said brake reaction plate member with said pins aligned normally to said brake disc member.

3. A disc brake for a bicycle as claimed in claim 1 wherein:
   said brake rotor member has a rotor plate member with an internal hub portion adapted to be secured to the bicycle wheel hub, said rotor plate member further including a radially extending plate portion having slot connections formed at its radially outermost edge; and
   said brake disc member includes axially extending projections interconnecting said slot connections to permit limited axial movement of said brake disc member.

4. A disc brake for a bicycle as claimed in claim 1 wherein:
   said screw actuator is a rotatively mounted annular member having helical screw threads formed on its radial outer surface and disposed radially inwardly from said annular pressure plate member; and
   said annular pressure plate member has mating helical screw threads on its radially inner surface threadedly connected with the helical screw threads of said screw actuator.

5. A disc brake for a bicycle as claimed in claim 4 including:
   a stud member secured at one end to said screw actuator and extending through an opening formed in said reaction plate so that one end is accessible on the outboard brake side.

6. A disc brake for a bicycle as claimed in claim 5 including:
   operator actuating means connected to said stud member to selectively actuate the brake in response to operator command.

7. A disc brake for a bicycle as claimed in claim 6 wherein:
   said operator actuating means includes a rod and one-way overrunning clutch adapted to be connected to a bicycle foot pedaled crank assembly to impart a brake actuating motion on back rotation of the crank assembly.

8. A disc brake for a bicycle having a frame supported shaft and a rotatable hub concentrically mounted about said shaft, said disc brake comprising: a brake rotor member having an annular plate portion providing braking surfaces on both sides thereof;
   a fixed reaction plate disposed on one side of said annular plate portion and having a friction surface in confronting relationship with one braking surface of said annular plate portion;
   an axially movable pressure plate disposed on the other side of said annular plate portion and having a friction surface in confronting relationship with the other braking surface of said annular plate portion;
   an annular screw support member rotatively mounted radially inwardly of said movable pressure plate and threadedly connected thereto; and
   means selectively rotating said pressure plate and said screw support member relative to one another about said threaded connection to axially move said pressure plate into and out of braking engagement with said brake rotor member.

9. A disc brake for a bicycle as claimed in claim 8 including:
   pin means connected to said reaction plate operatively connected to one of said screw support member and pressure plate member to prevent rotation thereof while permitting limited axial motion; and
   a stud member connected to the other of said screw support member and pressure plate member to apply limited rotation thereto.

10. A disc brake for a bicycle as claimed in claim 9 wherein:
   said pin means is connected to said pressure plate member and said stud member is connected to said screw support member.

* * * * *